No. 709,558. Patented Sept. 23, 1902.
W. P. RICE.
APPARATUS FOR CONVEYING GRAIN IN MALT HOUSES.
(Application filed Sept. 7, 1901.)
(No Model.)
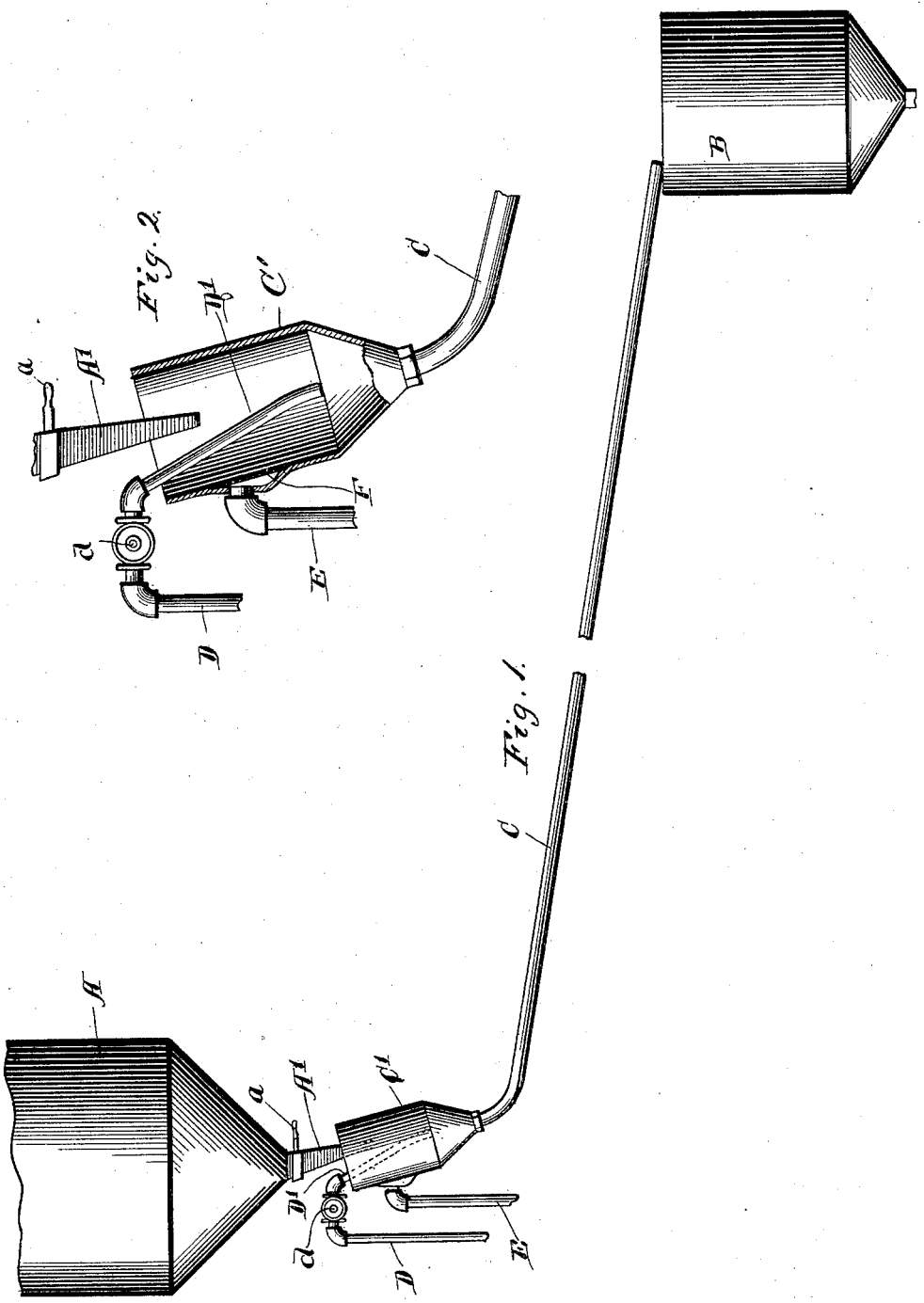
Witnesses:
Carl M. Crawford
William L. Hall
Inventor:
William P. Rice
by Poole & Brown
his Attorneys

UNITED STATES PATENT OFFICE.

WILLIAM P. RICE, OF CHICAGO, ILLINOIS.

APPARATUS FOR CONVEYING GRAIN IN MALT-HOUSES.

SPECIFICATION forming part of Letters Patent No. 709,558, dated September 23, 1902.

Application filed September 7, 1901. Serial No. 74,649. (No model.)

*To all whom it may concern:*

Be it known that I, WILLIAM P. RICE, of Chicago, in the county of Cook and State of Illinois, have invented certain new and useful Improvements in Apparatus for Conveying Grain in Malt-Houses; and I do hereby declare that the following is a full, clear, and exact description thereof, reference being had to the accompanying drawings, and to the letters of reference marked thereon, which form a part of this specification.

This invention relates to an apparatus designed for use in the art of malting for mixing with the grain to be malted, prior to its introduction to the steeping-tank, the water in which said grain is subsequently steeped and conveying the admixture of grain and water to the steeping-tank by gravity and discharging the same together in the steeping-tank, whereby said grain is steeped in the water previously admixed therewith and in which it is conveyed to the tank.

The invention consists in the matters hereinafter set forth, and more particularly pointed out in the appended claims.

In the manufacture of malt from grain the first step of the process consists in moistening or steeping the grain with a suitable quantity of water in what is known as a "steeping-tank," said grain being admixed with the water in said tank a period of time to properly soften the same for the purpose of promoting germination when placed on the malt-floor. Heretofore it has been the common practice in charging the steeping-tank with the grain and water to first convey the grain to such tank by means of suitable conveying apparatus and thereafter fill the tank with the required amount of water. This operation necessitates the employment of spiral or belt conveyers and the like, which require considerable power for their operation, a large part of the power developed in a malt-house being employed for this purpose. With my improved apparatus I propose to discharge the water necessary for steeping the grain into the grain-supply pipe at the induction end thereof, or the end into which the grain is introduced, and to convey the admixture of grain and water to the steeping tank or tanks by gravity, the grain-supply pipe leading from the grain-bin to the tub being for this purpose disposed at such an inclination to the horizontal that the commingled water and grain is conveyed to the steeping tank or tanks by gravity alone, whereby no power is required for effecting the transference of the grain to the steeping tank or tanks after the same has been delivered to the pipe leading to the steeping tank or tanks. The water is delivered to the induction end of the grain-supply pipe at practically a normal pressure, and no further power is required to deliver the water to said pipe excepting that necessary to lift the same to the level of said eduction end of the pipe, and there is therefore no necessity for the development of power to give pressure to the water to force the admixture of grain and water through said supply-pipe.

By the use of the means above set forth for conveying the grain to the steeping tank or tanks the power heretofore required for operating conveyers to convey the dry grain to the tank or tanks is saved, the proper amount of water is mixed with said grain without the necessity of giving attention thereto at a point remote from the grain-bin, the power required to lift the water only exceeds that heretofore required by the amount necessary to elevate the water from the level of the steeping tank or tanks to the grain-bin, and said grain is washed and brightened during its passage from the bin to the steeping tank or tanks.

The invention will be more fully understood by reference to the accompanying drawings, in which—

Figure 1 is a view, principally diagrammatic in its nature, showing a grain-bin and a steeping-tank and an apparatus for conveying the grain from the bin to the tank. Fig. 2 is a detail view, partly in section, of the induction end of the pipe leading from the bin to the tank, showing the means for introducing the water and grain thereinto.

As shown in said drawings, A designates the grain-bin, which in practice is located in a storage-elevator conveniently near the malt-house, and B designates a steeping-tank located at the malt-house.

C designates a pipe extending from the bin to the steeping-tank, through which the grain is transferred from said bin to the tank. Said pipe C is provided at the induction or receiving end with an enlargement or casing C', which is open at its upper end and communicates at its lower end with the pipe C, and the bin A is provided with a conical lower end, which terminates in a discharge-spout A', which latter extends through the upper open end of the casing C' and discharges the grain into said casing and therethrough into the pipe C. Said spout A' is provided with a regulating gate or valve a. The casing C' is arranged in an inclination with respect to the perpendicular, being inclined toward the direction of the pipe C, and the spout A' is correspondingly inclined.

D designates a water-supply pipe which leads from any suitable source supplying water and is provided with a discharge end D', which enters the casing C' through the upper open end thereof, as herein shown. Said water-pipe preferably extends below the discharge end of the spout A' of the grain-bin and is arranged to discharge the water centrally of the casing. The effect of thus extending the pipe below the spout is to impart to the stream of water issuing from the pipe and before it is mixed with the grain a velocity sufficient to properly mix the grain with the water and to produce an additional initial force to impel the grain and water through the pipe C toward the steeping-tank. Said water-pipe is provided with a valve d, by which the passage of water through the pipe is controlled.

E designates an overflow-pipe which leads outwardly and downwardly from the casing C' and is adapted to prevent the water rising a sufficient distance to enter the lower end of the spout A' in case the water be delivered to the pipe C in too great a volume or in case the discharge end of the pipe C be clogged by an overfilling of the tank B. A screen F is placed between the induction end of the overflow-pipe and the interior of the casing to prevent the escape of grain into said pipe.

The pipe C may be made of any length required to convey the grain from the bin to the steeping tank or tanks. I have herein shown one pipe adapted to supply a single tank; but it will be understood that the pipe C may be branched to supply as many steeping-tanks as required and connected with said tanks either in serial or multiple order. As before stated, the pipe C is inclined or given a sufficient fall to carry the admixture of grain and water therethrough by gravity alone and without the necessity of depending upon pressure of water delivered to the pipe C. With this construction it will be seen that as compared with the prevailing practice of separately conveying grain and water to the steeping tank or tanks I am enabled to save entirely the power heretofore required for operating the conveyers and am only required to expend power in addition to that heretofore required for lifting the water necessary for lifting the water a vertical distance equal to the differences in level between the steeping-tank and the upper or induction end of the pipe C, which manifestly is very small. Inasmuch as the power required for conveying the dry grain to the steeping tank or tanks has been heretofore a large part of the operating expense in a malt-house, I am enabled to materially reduce the expense of producing the malt. The water and grain become thoroughly admixed in the pipe C and move at a uniform rate of velocity throughout, and I am therefore by the use of the controlling-valves described enabled to accurately proportion the water with respect to the grain, and thereby move the grain by the use of approximately or exactly the volume of water required in the steeping process. Moreover, by reason of the fact that the inclination of the pipe C is so disposed that only the amount of water is required to convey the grain to the steeping tank or tanks as is required for properly steeping the grain I am thereby enabled to economize in this part of the operation as compared to a construction wherein the pipe is substantially horizontal and power is required for producing pressure on the water to drive the grain through said pipe. Not only in this latter construction is there a greater expense involved in producing the power to give the required pressure for conveying the body of water and grain, but I am also enabled to save as compared with such a construction a large volume of water in the operation of filling a steeping-tank. In the construction last mentioned the body of grain would tend to sink to the bottom of the pipe and to move therein in a solid body and a large percentage of the water would flow over said body of grain. A large quantity of water is required, therefore, to be pumped beyond that necessary for properly steeping the grain. The grain in its passage through the pipe C is cleansed from dust and stains adhering thereto, and the brightening of the grain incident to such cleansing increases its value and the value of the malt produced therefrom. This washing process is promoted by giving the proper inclination to the pipe C, for the reason that the water and grain become uniformly intermingled, so as to form what may be termed a "uniform semiliquid mixture," so that the grain in its passage through the pipe is thoroughly agitated and the individual grains are rubbed and ground together and against all parts of the walls of the pipe, thereby promoting the cleansing operation to a much greater extent than if the pipe be horizontal and the flow of water under pressure be depended upon to move the grain. In the latter event the grain would tend to sink and remain in a solid mass at the bottom of the pipe, whereby the water would not become so thoroughly admixed with the grain, a large percentage of the water tending to flow over the grain, while the main body of the grain would be carried along the bottom of the pipe in a more or less compact condition. With my construction, on the other hand, the grain is uniformly mixed with the water, with the result of a more thorough cleansing, as before explained. Not only is the grain more thoroughly cleansed, but the liability of the pipe clogging is greatly reduced as compared with a construction wherein the pipe is substantially horizontal and pressure of the water is required for conveying the grain therethrough.

A further advantage of the apparatus described is that the delivery of the admixture of water and grain to the tank is such that the light and ungerminating corns and the dirt or chaff mixed with the grain (all of which should be separated from the body of the grain) rise to the top of the body of water in the tank as soon as delivered thereto, so that said lighter corns and the foreign particles may be removed from the tank by a skimming operation or allowing the same to overflow from the tank. This action is due to the fact that the mixing of the grain and water in the conveying pipe or conduit and the agitation thereof in said conduit effects an almost complete separation of the lighter particles from the heavier productive corns, so that said lighter particles when the admixture is delivered to the tank at once rise to the top of the water in the tank. Another factor aiding the effective separation of the lighter from the heavier particles is that the grain and water are delivered to the tank in a relatively small stream and are immediately spread upon being delivered to the tank in a thin mass upon the top of the water or admixture of grain and water, thereby producing a maximum impediment to the rise of the lighter particles. If the grain be delivered in a solid body to the steeping-tank and thereafter submerged in the water in which it is steeped or the water first delivered to the tank and the grain thereafter discharged thereinto, the separation of such lighter and unproductive corns and the foreign particles from the body of the grain will be very limited unless said body of grain is thoroughly stirred or agitated, such agitation increasing the expense of the steeping process. By the use of my improved apparatus, therefore, the separation of the lighter and unproductive corns and the dirt and chaff from the grain becomes automatic and is effected without the employment of extra apparatus or labor.

I claim as my invention—

1. An apparatus for use in a malt-house designed to mix grain and water and to thereafter convey the same to a steeping-tank for the purpose of steeping the grain comprising, in combination with a steeping-tank, a pipe or conduit, means for delivering grain to said pipe or conduit, means for delivering water thereto, said pipe or conduit being inclined downwardly from its receiving to its discharge end and emptying directly into said tank, whereby the admixture of grain and water is conveyed by gravity through said pipe or conduit, is discharged into said tank and the grain is steeped in the water admixed therewith in said pipe.

2. The combination with a grain-bin and a steeping-tank, of means for conveying to said tank grain and water comprising a supply-passage leading from the grain-bin, a pipe or conduit leading from the bin to the said tank and which receives grain from said supply-passage, a water-supply pipe discharging into the receiving end of said pipe or conduit, said pipe or conduit being inclined downwardly from its receiving to its discharge end and emptying into said tank, and means for controlling the supply of grain and water to said pipe or conduit, whereby the grain and water may be delivered in desired proportionate quantities to the receiving end of the said pipe or conduit and will be conveyed by gravity through said pipe or conduit and discharged together into said tank.

3. The combination with a grain-bin provided with a discharge-spout and a steeping-tank, of means for conveying grain and water to said tank comprising a pipe or conduit which leads to said tank and into which said bin-spout discharges, and a water-pipe entering said pipe or conduit adjacent to the bin-spout and passing downwardly thereinto below the discharge end of said bin-spout, said pipe or conduit being inclined downwardly from its receiving to its discharge end and emptying into said tank, whereby the admixture of water and grain is conveyed by gravity through said pipe or conduit and is discharged into said tank.

4. The combination with a grain-bin and a steeping-tank, of a pipe or conduit which receives grain from said bin and discharges into said tank, a water-pipe discharging into the receiving end of said pipe or conduit, said pipe or conduit being inclined downwardly from its receiving to its discharge end whereby the grain and water is conveyed to the tank by gravity, and an overflow-pipe connected with the receiving end of said pipe or conduit.

5. The combination with a grain-bin and a steeping-tank, of a pipe or conduit which receives grain from said bin and discharges into said tank, a water-pipe discharging into the receiving end of said pipe or conduit, said pipe or conduit being inclined downwardly from its receiving to its discharge end, whereby the grain and water is conveyed to the tank by gravity, an overflow-pipe connected with the receiving end of said pipe or conduit, and a screen located between the receiving end of said overflow-pipe and said pipe or conduit.

6. The combination with a grain-bin provided with a discharge-spout and a steeping-tank, of a pipe or conduit provided at its receiving end with an enlarged receiving-chamber into which the bin-spout discharges, said conduit discharging into said steeping-tank, a water-pipe entering said receiving-chamber and discharging centrally of said chamber below the level of the discharge end of said bin-spout, said pipe or conduit being inclined downwardly from its receiving to its discharge end, whereby the grain and water are conveyed to the tank by gravity, and the receiving-chamber being obliquely disposed at a downward inclination toward the tank greater than that of said pipe or conduit.

In testimony that I claim the foregoing as my invention I affix my signature, in presence of two witnesses, this 31st day of August, A. D. 1901.

WILLIAM P. RICE.

Witnesses:
 WILLIAM L. HALL,
 GERTRUDE BRYCE.